H. E. KERR.
VALVE.
APPLICATION FILED MAY 20, 1911.

1,014,230.

Patented Jan. 9, 1912.

Witnesses
Albert A. Hofmann.
Elizabeth M. Brown.

Inventor
Harry E. Kerr.
By Edward N. Pagelsen
Attorney

UNITED STATES PATENT OFFICE.

HARRY E. KERR, OF DETROIT, MICHIGAN.

VALVE.

1,014,230.  Specification of Letters Patent.  Patented Jan. 9, 1912.

Application filed May 20, 1911. Serial No. 628,541.

*To all whom it may concern:*

Be it known that I, HARRY E. KERR, a citizen of the Dominion of Canada, and a resident of Detroit, in the county of Wayne and State of Michigan, have invented a new and useful Valve, of which the following is a specification.

This invention relates to means for the prevention of leakage around the stems of valves, and its object is to provide a simple and effective construction of valve stem and the mountings for the same which may be employed in connection with valve bodies of many types.

Figure 1:
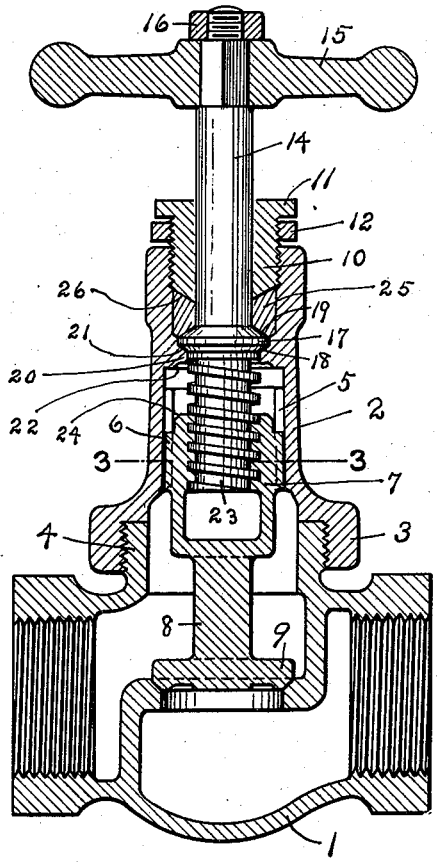
Figure 2:
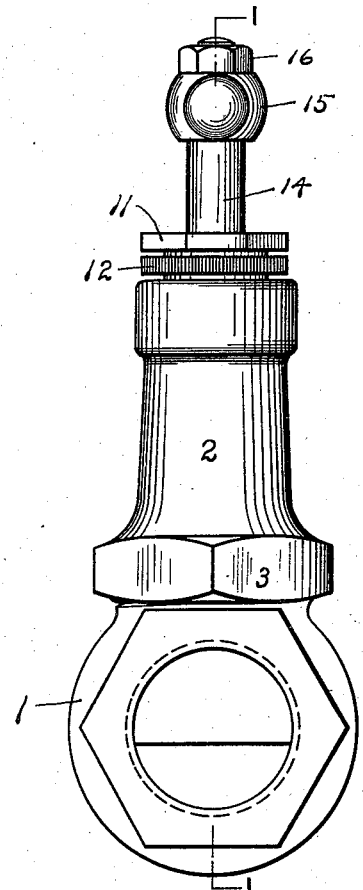
Figure 3:
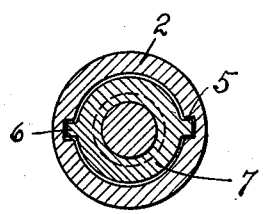

In the accompanying drawing, Figure 1 is a section on the line 1—1 of Fig. 2. Fig. 2 is an elevation of the valve. Fig. 3 is a section on the line 3—3 of Fig. 1.

Similar reference characters refer to like parts throughout the several views.

The valve body 1 may be of any desired construction and forms no part of the present invention. A bonnet 2 is formed with a lower threaded ring 3 which screws onto the upper ring 4 of the body. The bore of the bonnet is formed with longitudinal grooves 5 in which are slidable the ribs 6 on the threaded sleeve 7 formed above the neck 8 of the valve disk or plug 9. The bore at the upper end of the bonnet may be screw-threaded for a portion of its length to receive the gland or sleeve 10 having a polygonal collar 11 so it can be easily turned. On the threaded portion may be placed a jam-nut 12 which is shown to have a knurled periphery. The stem 14 may be squared at its upper end to receive the handle 15 which may be held in position by a nut 16. A collar 17 is formed on the stem intermediate its ends and has the inclined upper face 19 and lower face 18. The bonnet has an interior flange 20 formed with a seat 21 to fit the face 18 of the stem collar and a second seat 22 for the properly machined upper end 24 of the sleeve 7. The lower end 23 of the stem is threaded to engage in the sleeve 7. Above the collar 17 is a ring 25, of some malleable metal or alloy, such as Babbitt metal, whose upper end is beveled to the angle of the end 26 of the sleeve 10.

The parts being assembled, the sleeve 10 is screwed down hard onto the ring 25 to expand it to fit the bore of the bonnet and also to force it down to fit the face 19. After the ring has been properly formed, the sleeve is turned back a short distance to permit the stem to be turned, but not sufficiently far to entirely free the collar 17. When steam or other fluids under pressure fill the bonnet when the valve 9 is seated, the passage of the fluid along the stem is prevented by the fit of the lower face of the ring 25 against the face 19 of the collar 17. The passage of the fluid around the collar is prevented by the tight fit of the collar in the bore of the bonnet. When the valve 9 is off its seat, the normal pressure of the sleeve 10 on the ring 25 will prevent leakage, as just described. If this is not sufficient, the sleeve 7 may be drawn up until its finished upper surface 24 seats on the surface 22 of the flange 20. This causes a downward pressure of the face 18 of the collar 17 against the surface 21 of the flange 20. This engagement of two pairs of faces prevents any leakage. When it is desired to remove the ring 25, the sleeve 10 is removed and the stem 14 turned to the left, which movement will cause the collar 17 to lift the ring 25 out of the bore. The action of the jam-nut 12 is to lock the sleeve 10 from turning in the usual manner.

The details and proportions of the various parts may be changed by those skilled in the art to meet the various demands of the trade.

Having now explained my construction, what I claim as my invention and desire to secure by Letters Patent is:—

1. In a valve, the combination of a body, a bonnet therefor, said bonnet having an outer bore and an interior flange intermediate its ends having a beveled upper face, a valve below the flange and adapted to engage a seat in the body, a stem engaging the valve and extending up through the bonnet, said stem having a collar formed with beveled upper and lower faces fitting against the upper face of the flange, a metal ring within the bore of the bonnet and fitting the upper face of the collar on the stem, and a sleeve, screw-threaded in the bore at the outer end of the bonnet and tapering downwardly, and engaging the upper end of the ring.

2. In a valve, the combination of a body, a hollow bonnet therefor having an enlarged portion engaging the body, an interior flange intermediate the ends, and also having a bore at its outer end beyond the flange which bore is smooth next to the flange and screw threaded at its outer end, a valve having a screw-threaded sleeve slidably mounted within the bonnet, a stem revolubly mounted within the bonnet and having a collar with inclined faces intermediate its ends and its inner end screw-threaded in said sleeve, said collar having its inner face fitting the adjacent face of the flange, a ring of malleable metal within said bore surrounding the stem and having an inclined inner face engaging the collar, and a gland having an inclined face to engage the ring, screw-threaded in said bore.

3. In a valve, the combination of a body, a bonnet therefor having an interior flange intermediate its ends, a valve mounted in the body and bonnet, a stem revolubly mounted in the bonnet and having a collar fitting against said flange, a malleable metal ring fitting the bore of the bonnet and the collar of the stem, and a screw threaded member having a downwardly tapering face engaging said ring to force the same in proper engagement with the bonnet and collar.

In testimony whereof I have signed this specification in the presence of two subscribing witnesses.

HARRY E. KERR.

Witnesses:
EDWARD N. PAGELSEN,
ELIZABETH M. BROWN.

Copies of this patent may be obtained for five cents each, by addressing the "Commissioner of Patents, Washington, D. C."